and a background downloading interface; taking file data (12) United States Patent
Di (10) Patent No.: US 12,341,845 B2
(45) Date of Patent: Jun. 24, 2025

(54) FILE DOWNLOADING METHOD AND APPARATUS, STORAGE MEDIUM, AND ELECTRONIC DEVICE

(71) Applicant: Beijing Bytedance Network Technology Co., Ltd., Beijing (CN)

(72) Inventor: Weiguang Di, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/289,359

(22) PCT Filed: May 26, 2022

(86) PCT No.: PCT/CN2022/095210
§ 371 (c)(1),
(2) Date: Nov. 2, 2023

(87) PCT Pub. No.: WO2023/273725
PCT Pub. Date: Jan. 5, 2023

(65) Prior Publication Data
US 2024/0244103 A1    Jul. 18, 2024

(30) Foreign Application Priority Data

Jun. 30, 2021   (CN) .......................... 202110738259.6

(51) Int. Cl.
*H04L 67/06* (2022.01)
*G06F 16/17* (2019.01)
*H04L 67/60* (2022.01)

(52) U.S. Cl.
CPC .......... *H04L 67/06* (2013.01); *G06F 16/1724* (2019.01)

(58) Field of Classification Search
CPC .............................. H04L 67/06; G06F 16/1724
See application file for complete search history.

(56) References Cited

U.S. PATENT DOCUMENTS 7,756,946 B1    7/2010  Roka et al.
2008/0133666 A1*  6/2008  Chavez ................... H04L 67/06
                                                                  709/205

(Continued)

FOREIGN PATENT DOCUMENTS

CN          101911052 A       12/2010
CN          107707590 A        2/2018
(Continued)

OTHER PUBLICATIONS

Grant Notice and Supplementary Search in CN202110738259.6, mailed Jul. 5, 2022, 4 pages.

(Continued)

*Primary Examiner* — Kamal M Hossain
(74) *Attorney, Agent, or Firm* — Astute IP Law Group (57) ABSTRACT

A file downloading method includes: switching, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface; taking file data downloaded by the first downloading interface this time as a file fragment, and determining index information of the file fragment; storing the index information in a database; and sequentially reading, based on a storage sequence of index information in the database subsequent to completing a task of downloading the target file, file fragments corresponding to the index information and splicing the file fragments to obtain the target file.

13 Claims, 6 Drawing Sheets

(56) References Cited

U.S. PATENT DOCUMENTS

| | | | | |
|---|---|---|---|---|
| 2014/0101343 A1* | 4/2014 | Townsend | ............... | A63F 13/23 |
| | | | | 710/14 |
| 2015/0242480 A1* | 8/2015 | Sheng | ................... | G06F 16/275 |
| | | | | 707/619 |
| 2015/0325268 A1* | 11/2015 | Berger | ............... | H04N 21/4335 |
| | | | | 386/248 |
| 2021/0303196 A1* | 9/2021 | Lv | ......................... | G06F 3/0679 |

FOREIGN PATENT DOCUMENTS

| | | | |
|---|---|---|---|
| CN | 108566561 | A | 9/2018 |
| CN | 109947504 | A | 6/2019 |
| CN | 110336871 | A | 10/2019 |
| CN | 112351086 | A | 2/2021 |
| CN | 113395353 | A | 9/2021 |
| WO | 2009140813 | A1 | 11/2009 |

OTHER PUBLICATIONS

International Search Report in PCT/CN2022/095210, mailed Aug. 17, 2022, 3 pages.
Office Action and Search Report in CN202110738259.6, mailed Apr. 6, 2022, 8 pages.

\* cited by examiner

FILE DOWNLOADING METHOD AND APPARATUS, STORAGE MEDIUM, AND ELECTRONIC DEVICE

CROSS REFERENCE TO RELATED APPLICATIONS

The present application is a national application of International Application No. PCT/CN2022/095210, filed on May 26, 2022, which claims priority to Chinese Patent Application No. 202110738259.6, filed on Jun. 30, 2021 and entitled "FILE DOWNLOADING METHOD AND APPARATUS, STORAGE MEDIUM, AND ELECTRONIC DEVICE", the disclosures of which are incorporated herein by reference in their entireties.

TECHNICAL FIELD

The present disclosure relates to the technical field of data downloading, in particular to a file downloading method and apparatus, a storage medium, and an electronic device.

BACKGROUND

In the related art, different downloading interfaces are commonly provided to perform downloads in different downloading scenarios. In an actual downloading process, some downloading interfaces may interrupt the download for some reasons. In this case, in order to save downloading resources and downloading time, it is very important to achieve the continuation of the download at a previous download location before switching and to obtain complete downloading data by combining files downloaded by different downloading interfaces in an orderly manner.

SUMMARY

This section is provided in order to present in brief form the ideas which will be described in detail hereinafter in the specific implementation section. This section is not intended to identify key features or essential features of the claimed technical solution, nor is it intended to limit the scope of the claimed technical solution.

In a first aspect, the present disclosure provides a file downloading method. The method includes: switching, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface; taking file data downloaded by the first downloading interface this time as a file fragment, and determining index information of the file fragment; storing the index information in a database; and sequentially reading, based on a storage sequence of index information in the database subsequent to completing a task of downloading the target file, file fragments corresponding to the index information and splicing the file fragments to obtain the target file.

In a second aspect, the present disclosure provides a file downloading apparatus. The apparatus includes: a response module configured to switch, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface; a determining module configured to take file data downloaded by the first downloading interface this time as a file fragment, and determine index information of the file fragment; a storage module configured to store the index information in a database; and a splicing module configured to sequentially read, based on a storage sequence of index information in the database subsequent to completing a task of downloading the target file, file fragments corresponding to the index information and splice the file fragments to obtain the target file.

In a third aspect, the present disclosure provides a computer-readable medium having a computer program stored thereon. The program, when executed by a processing apparatus, implements steps of the above method in the first aspect.

In a fourth aspect, the present disclosure provides an electronic device. The electronic device includes: a storage apparatus having one or more computer programs stored thereon; and one or more processing apparatuses configured to execute the one or more computer programs in the storage apparatus, to implement steps of the above method in the first aspect.

With the above technical solutions, in response to the obtained downloading interface switching request, the first downloading interface for currently downloading the target file is switched to the second downloading interface for continuously downloading the target file, such that next download may start from the current breakpoint location; moreover, the file data downloaded by the first downloading interface or the second downloading interface each time is used as a file fragment of the target file, the index information of all the file fragments is recorded by the database, and subsequent to completing the task of downloading the target file, the file fragments corresponding to the index information are sequentially read based on the storage sequence of the index information in the database and spliced to obtain the target file, such that breakpoint resume of the target file is achieved, and downloading resources, downloading time and the like are saved.

Other features and advantages of the present disclosure will be described in detail in the subsequent detailed description.

BRIEF DESCRIPTION OF DRAWINGS

The above and other features, advantages and aspects of embodiments of the present disclosure will become more apparent in conjunction with the accompanying drawings and with reference to the following specific implementation. Throughout the accompanying drawings, identical or similar reference numerals indicate identical or similar elements. It is to be understood that the accompanying drawings are schematic and that the originals and elements are not necessarily drawn to scale, in which.

DESCRIPTION OF EMBODIMENTS

Embodiments of the present disclosure will be described in more detail below with reference to the accompanying drawings. While some embodiments of the present disclosure are shown in the accompanying drawings, it is to be understood, however, that the present disclosure may be implemented in various forms and should not be construed as being limited to the embodiments set forth herein; rather, these embodiments are provided for a more thorough and complete understanding of the present disclosure. It is to be understood that the accompanying drawings and embodiments of the present disclosure are merely for exemplary purposes and are not intended to limit the scope of protection of the present disclosure.

It is to be understood that the individual steps documented in the method embodiment of the present disclosure may be performed in a different order, and/or in parallel. In addition, the method embodiment may include additional steps and/or omit the steps illustrated. The scope of the present disclosure is not limited in this regard.

As used herein, the term "include" and variations thereof are opening form, i.e., "includes but is not limited to". The term "based on" is "based, at least in part, on". The term "an embodiment" indicates "at least one embodiment"; the term "another embodiment" indicates "at least one additional embodiment"; and the term "some embodiments" indicates "at least some embodiments". Relevant definitions of other terms will be given in the description below.

It is to be noted that the concepts "first", "second" and the like mentioned in the present disclosure are used merely to distinguish between different apparatuses, modules or units, and are not intended to define the order or interdependence of the functions performed by these apparatuses, modules or units.

It is to be noted that the modifications of "one" and "a plurality of" referred to in the present disclosure are illustrative and not restrictive, and it is to be understood by those skilled in the art that they should be understood as "one or more" unless otherwise expressly stated in the context.

The names of messages or information interacted by a plurality of apparatuses in the implementation of the present disclosure are for illustrative purposes merely and are not intended to limit the scope of these messages or information.

In the related art, for example, in iPhone Operation System (IOS), after an application is switched from the foreground to the background during the existence of a download task, the application may be hung by the system after a few seconds and stops the relevant code execution; however, in order to meet the download task in the background, the IOS still provides a relevant system application programming interface (API) for long time download, but since a foreground downloading interface is not compatible with a background downloading interface and storage directories for download are different, orderly breakpoint resume of a plurality of files may not be achieved.

In view of this, an embodiment of the present disclosure provides a file downloading method to achieve breakpoint resume of file fragments, belonging to a target file, downloaded via different downloading interfaces provided by the foreground and the background, thereby saving downloading resources, downloading time, etc.

The present disclosure is further illustrated below in conjunction with the accompanying drawings.

Figure 1:
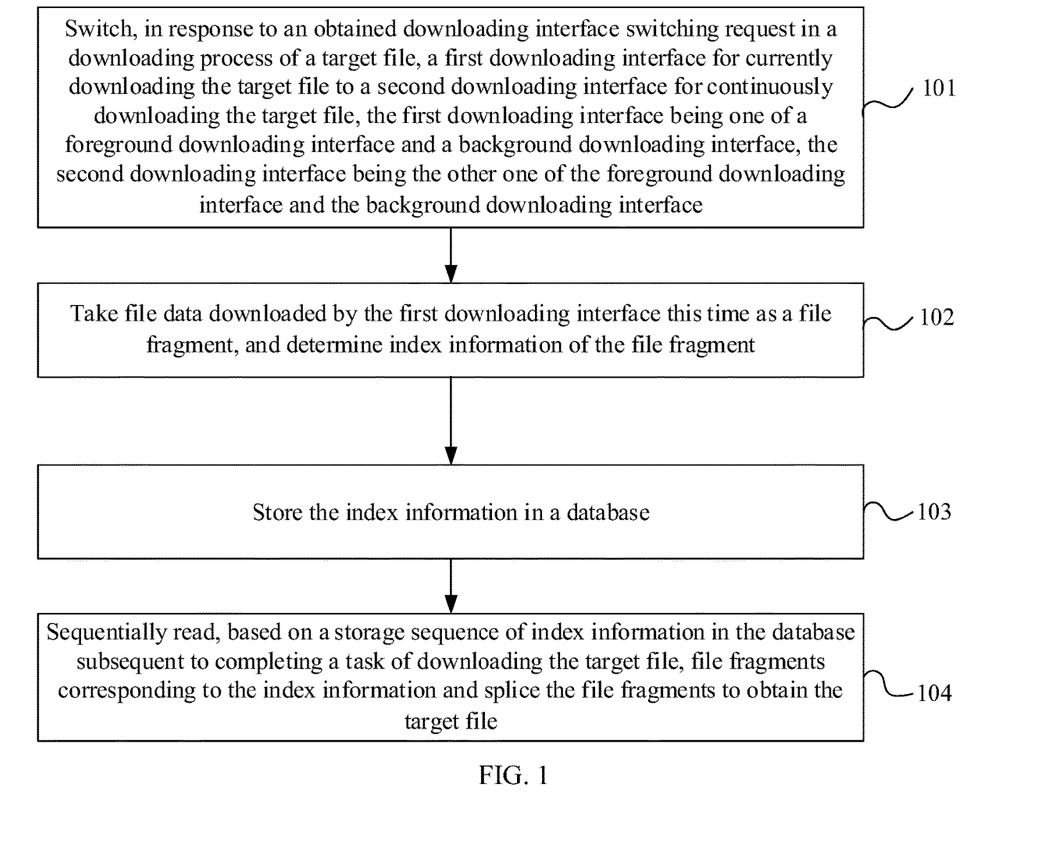
FIG. 1 is a flowchart of a file downloading method according to an exemplary embodiment of the present disclosure.

FIG. 1 is a flowchart of a file downloading method according to an exemplary embodiment of the present disclosure. Referring to FIG. 1, the file downloading method may be applied to smart phones, smart tablets and other electronic devices. The file downloading method includes the followings.

At Step S101, in response to an obtained downloading interface switching request in a downloading process of a target file, a first downloading interface for currently downloading the target file is switched to a second downloading interface for continuously downloading the target file, the first downloading interface is one of a foreground downloading interface and a background downloading interface, the second downloading interface is the other one of the foreground downloading interface and the background downloading interface.

It is to be noted that, with an electronic device being a smartphone as an example, the foreground refers to an application currently being used by the smartphone, and downloads of the application in the foreground are implemented by the foreground downloading interface; and the background refers to an application that is not used but not closed, and downloads of the application in the background are implemented by the background downloading interface.

It is to be understood that when the first downloading interface is the foreground downloading interface, the second downloading interface is the background downloading interface, and when the first downloading interface is the background downloading interface, the second downloading interface is the foreground downloading interface.

For example, the foreground downloading interface may be a downloading interface provided by a private network library of a third party, and the private network library of the third party may be a Cronet network library; and the background downloading interface may be a downloading interface provided by the IOS.

For example, the target file may be a video file, an installation package file, an audio file, etc., which is not limited here by this embodiment.

For example, whether the downloading interface switching request has been initiated may be determined by adopting a listening function. The listening function may be pre-configured, and a configuration method thereof may be referred to the relevant art and is not repeated here by this embodiment.

At Step S102, file data downloaded by the first downloading interface this time is taken as a file fragment, and index information of the file fragment is determined.

Figure 2:
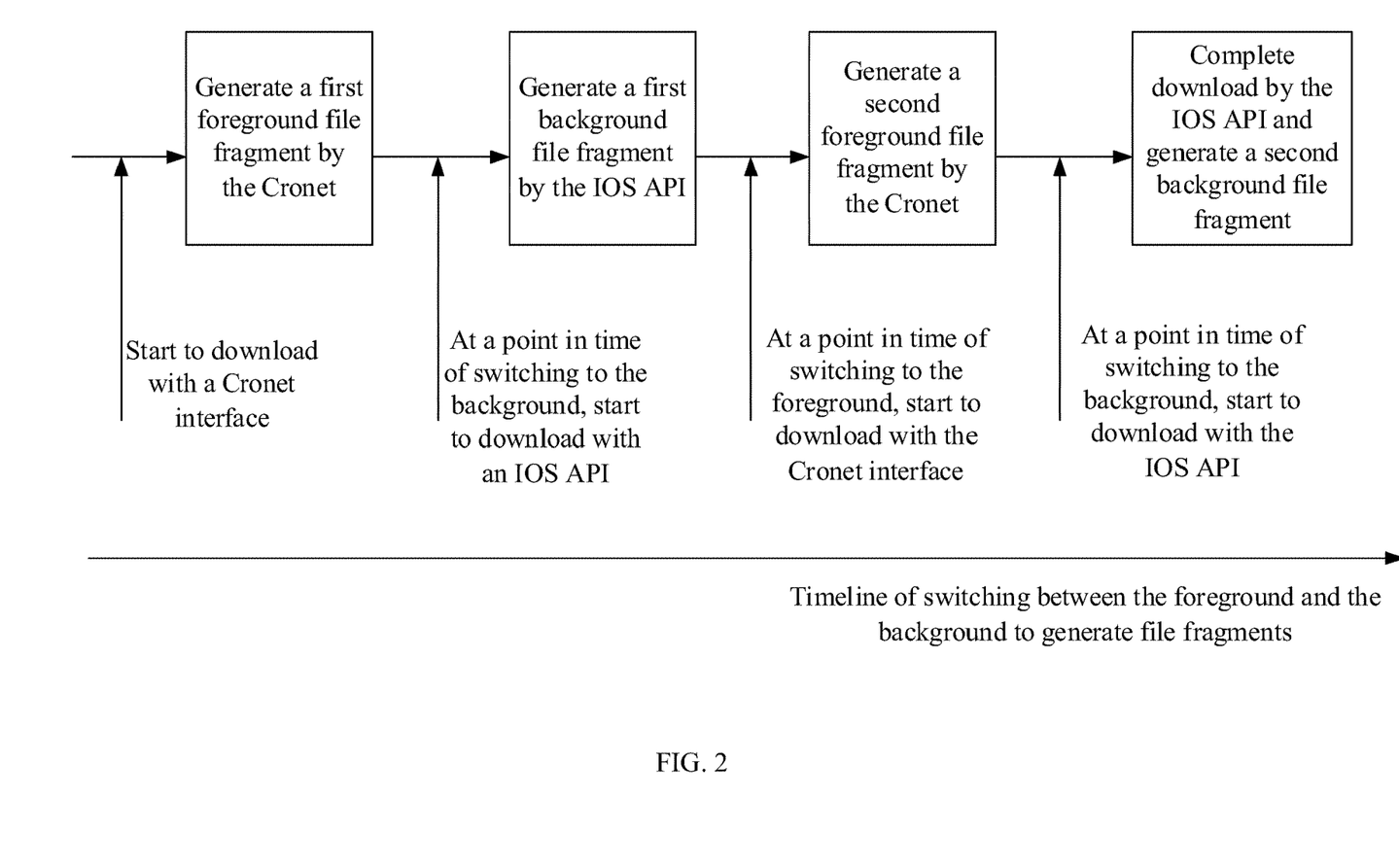
FIG. 2 is a schematic diagram of a process of generating file fragments according to an exemplary embodiment of the present disclosure.

For example, referring to FIG. 2, FIG. 2 is a schematic diagram of a process of generating file fragments according to an exemplary embodiment of the present disclosure. In FIG. 2, the foreground downloading interface is a Cronet interface as an example, and the background downloading interface is an IOS API as an example. Specifically, when an application starts the download of the target file, as the application must be in the foreground when the download starts, the target file may start to be downloaded firstly by the Cronet interface corresponding to the application, the application is switched from the foreground to the background at a certain point in time, and file data downloaded by the Cronet interface this time is a first foreground file fragment; the IOS API continues the download, the application is switched from the background to the foreground at a certain point in time, and file data downloaded by the IOS API this time is a first background file fragment; and then the Cronet interface continues the download to continue to generate a second foreground file fragment, and the download of the target file is completed by the IOS API to generate the last file fragment, that is, a second background file fragment.

In this embodiment, the index information is information characterizing a storage location of a file fragment, and query of the file fragment may be achieved based on the information.

At Step S103, the index information is stored in a database.

At Step S104, based on a storage sequence of index information in the database subsequent to completing a task of downloading the target file, file fragments corresponding to the index information is sequentially read and spliced to obtain the target file.

It is to be noted that the storage sequence of the index information in the database characterizes the sequence of locations of the file fragments in the entire target file. Thus, breakpoint resume of a plurality of file fragments may be achieved by sequentially reading the file fragments corresponding to the index information based on the storage sequence of the index information in the database and splicing the file fragments.

Figure 3:
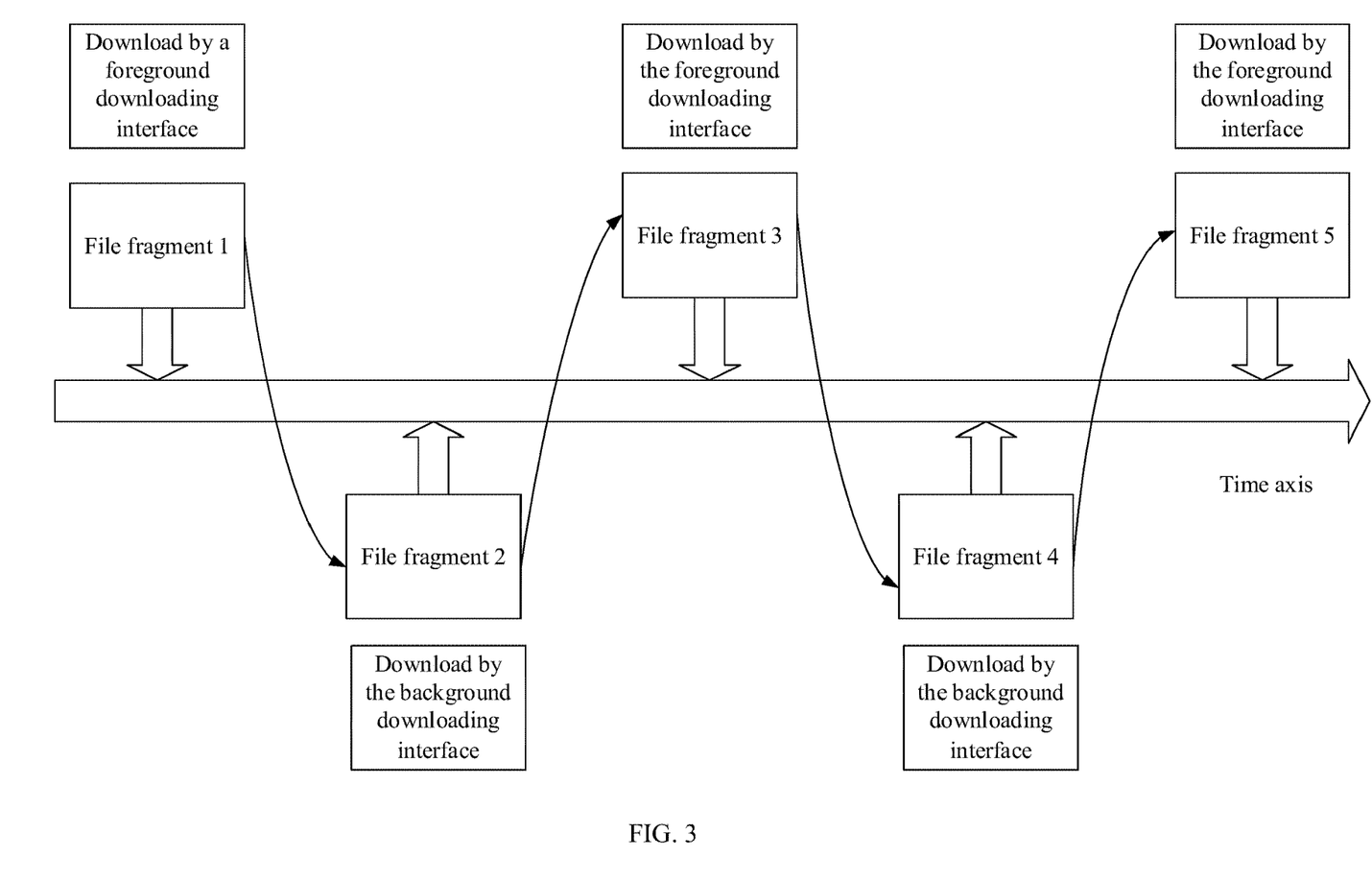
FIG. 3 is another schematic diagram of a process of generating file fragments according to an exemplary embodiment of the present disclosure.

For example, referring to FIG. 3, FIG. 3 is another schematic diagram of a process of generating file fragments according to an exemplary embodiment of the present disclosure. The downloaded target file includes a first file fragment, a second file fragment, a third file fragment, a fourth file fragment, and a fifth file fragment downloaded sequentially based on a time sequence, the first file fragment, the third file fragment and the fifth file fragment are file fragments downloaded by the foreground downloading interface, the second file fragment and the fourth file fragment are file fragments downloaded by the background downloading interface, the arrow direction of connection lines of the file fragments in FIG. 3 indicates the sequence of sequential splicing of the file fragments.

During the actual splicing, index information of the first file fragment, the second file fragment, the third file fragment, the fourth file fragment, and the fifth file fragment is sequentially stored in the database, and the corresponding file fragments may be queried based on the index information of each file fragment, and are spliced.

In this way, in response to the obtained downloading interface switching request, the first downloading interface for currently downloading the target file is switched to the second downloading interface for continuously downloading the target file, such that next download may start from the current breakpoint location. Moreover, the file data downloaded by the first downloading interface or the second downloading interface each time is used as a file fragment of the target file, the index information of all the file fragments is recorded through the database, and subsequent to completing the task of downloading the target file, the file fragments corresponding to the index information are sequentially read based on the storage sequence of the index information in the database and spliced to obtain the target file, such that breakpoint resume of the target file is achieved, and downloading resources, downloading time and the like are saved. In addition, in a technical solution of implementing splicing based on download time, as the download time is related to the system time, if the system time changes during the downloading process, the target file spliced based on the download time may have splicing errors, and therefore, in the present disclosure, the storage sequence of all the index information is strictly recorded by the database, so as to improve the splicing accuracy of the target file.

In a possible implementation, the method further includes: transferring file data downloaded by the background downloading interface from a temporary storage location into a disk in real time.

In the related art, the file data downloaded by the foreground downloading interface is stored in the disk, and the file data downloaded by the background downloading interface is stored in the temporary storage location. Considering that files in the temporary storage location are prone to loss, the file data downloaded by the background downloading interface is transferred from the temporary storage location to the disk in real time to avoid causing the loss of file fragments, thereby ensuring the integrity of each file fragment during splicing of the target file.

In a possible implementation, the switching the first downloading interface for currently downloading the target file to the second downloading interface for continuously downloading the target file in Step 101 shown in FIG. 1 may include: taking a location, in the target file, of file data in the file fragment that has been written and stored to the disk as a breakpoint location; and continuing to download the target file from the breakpoint location by the second downloading interface. In this case, the determining index information of the file fragment may include: determining the index information based on a start offset address and a disk termination offset address, in the disk, of the file data in the file fragment that has been written and stored to the disk.

It is to be noted that in the downloading process of a file, downloaded data is first cached in a memory and then written from the memory to the disk. In this technical context, a breakpoint location in this example is a location, in the target file, of the file data in the file fragment that has been written and stored to the disk, and the second downloading interface continues to download the target file from the breakpoint location, such that the downloaded file fragment may have the problem of duplicate file data. For example, for example, the first file fragment is a file of 100 bytes, only 99 bytes of the first file fragment have been written to the disk in response to the downloading interface switching request, in this case, a location of a 99th byte of the target file is determined as the breakpoint location, and thus a downloading start location of the next file fragment is the location of the 99th byte, which may result in the existence of a 100th byte in both the first file fragment and the next file fragment, and then cause duplicate data in the target file during splicing.

Considering the above case, the index information is determined based on the start offset address and the disk termination offset address, in the disk, of the file data in the file fragment that has been written and stored to the disk.

It is to be noted that a file offset address (disk offset address) refers to an address of data in a PE file, and is the offset relative to the beginning of a file when the file is stored in a disk. The start offset address characterizes a start location of the file fragment stored in the disk, and the termination offset address characterizes a termination location of the file fragment stored in the disk. Data stored between the start location and the termination location is the file data of the file fragment. In the present disclosure, the start offset address and the disk termination offset address are used to ensure that no duplicate file data is generated during splicing of the target file.

Figure 4:
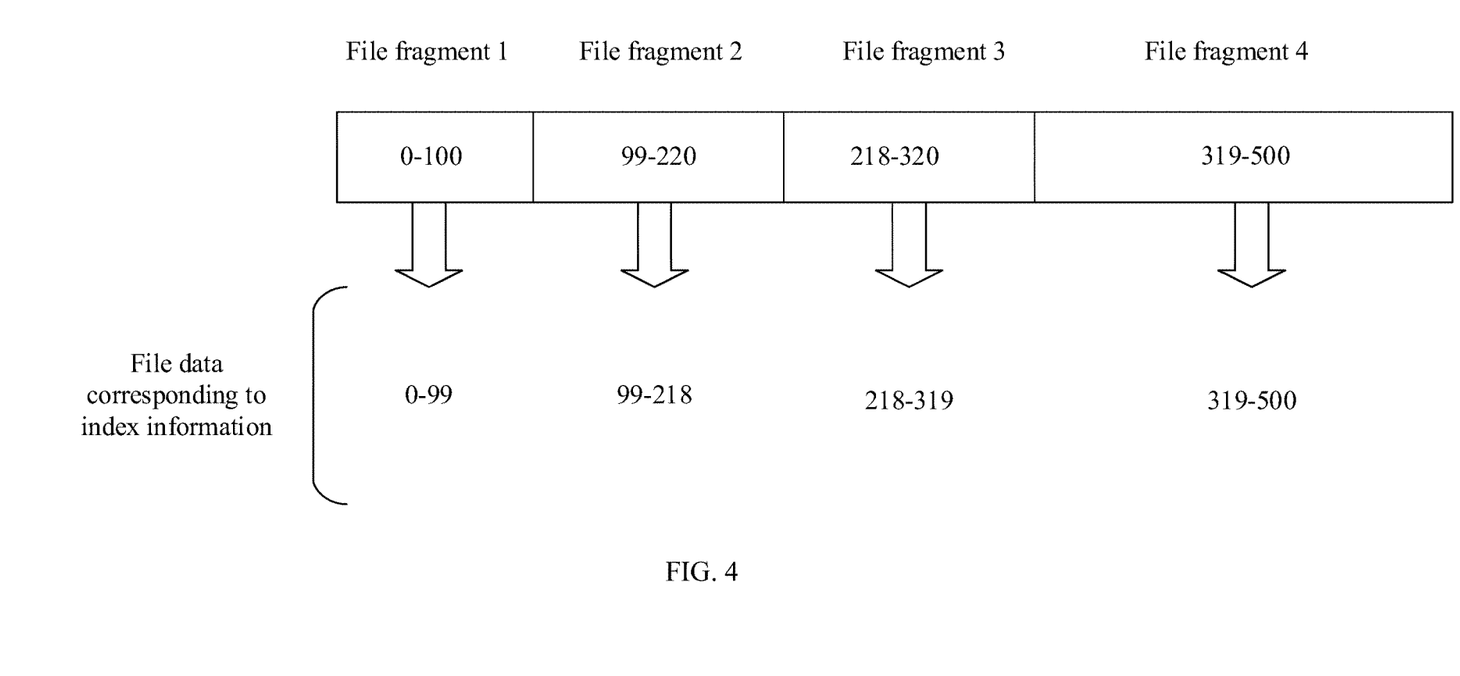
FIG. 4 is a schematic diagram of splicing of file fragments according to an exemplary embodiment of the present disclosure.

For example, referring to FIG. 4, FIG. 4 is a schematic diagram of splicing of file fragments according to an exemplary embodiment of the present disclosure. As shown in FIG. 4, every two adjacent file fragments have duplicate data, and if the file fragments stored in the disk are directly spliced, part of data of the target file may be duplicate, which eventually leads to errors in the target file. Thus, in order to solve this problem, with the index information, target data may be obtained by reading, from each file fragment, the file data corresponding to the index information based on the start offset address and the disk termination offset address indicated by the index information, and splicing the file data. If the index information of each file fragment is not recorded, data corresponding to the 100th byte may be duplicated at the connection of the first file fragment and the second file fragment, data corresponding to a 219th byte and a 200th byte may be duplicated at the connection of the second file fragment and the third file fragment, and data corresponding to a 320th byte may be duplicated at the connection of the third file fragment and the fourth file fragment, thereby causing errors in the target file.

Further, based on the above example, Step 104 shown in FIG. 1 may include: determining, for each piece of the index information, a target file fragment corresponding to the piece of the index information, reading, from the target file fragment, file data between the disk start offset address and the disk termination offset address in the index information, and sequentially splicing the read file data to obtain the target file.

In this way, the location, in the target file, of the file data in the file fragment that has been written and stored to the disk is used as the breakpoint location, the target file continues to be downloaded based on the breakpoint location, and the start offset address and the disk termination offset address, in the disk, of the file data in the file fragment that has been written and stored to the disk are used as the index information upon file splicing, thereby ensuring that the spliced target file does not have duplicate data.

In a possible implementation, the index information of each of the file fragments further includes a fragment index identifier. The taking file data downloaded by the first downloading interface this time as a file fragment in Step 102 shown in FIG. 1 may include: taking the file data downloaded by the first downloading interface this time as a file fragment, and setting a file fragment identifier of the file fragment.

It is to be noted that each file fragment identifier uniquely corresponds to one file fragment. The file fragment identifier may be a numeric identifier or an alphabetic identifier, which is not limited here by this embodiment.

It may be understood that after the file fragment identifier of a file fragment is set, a fragment index identifier that uniquely corresponds to the file fragment identifier may be set and stored in the database as the index information of the file fragment.

In this case, the determining, for each piece of the index information, a target file fragment corresponding to the piece of the index information, and reading, from the target file fragment, file data between the disk start offset address and the disk termination offset address in the index information includes: determining, for each piece of the index information, the target file fragment corresponding to the piece of the index information based on the fragment index identifier of the index information and the file fragment identifier; and reading, from the target file fragment, the file data between the disk start offset address and the disk termination offset address in the index information.

Since the fragment index identifier of the index information uniquely corresponds to the file fragment identifier, a unique file fragment identifier may be determined through the fragment index identifier, and then an unique target file fragment may be determined based on the file fragment identifier.

In this way, the target file fragment is determined by setting the corresponding identifiers, and the splicing efficiency of the file fragments is improved.

In a possible implementation, the database is a key-value database, keys in key-value pairs in the key-value database correspond to disk names of disks, and values in the key-value pairs in the key-value database correspond to index information of file fragments under the disks corresponding to the disk names.

In the present disclosure, considering that there may be a plurality of target files downloaded at the same time, key-value pairs are set in the database, and disks and index information corresponding to the plurality of target files respectively are maintained by the key-value pairs. Thus, when the index information of the file fragment of each of the target files is stored, the index information of the file fragment of each target file may be recorded in a strict order, thereby ensuring that the normal splicing of each target file is achieved subsequently based on the database.

Figure 5:
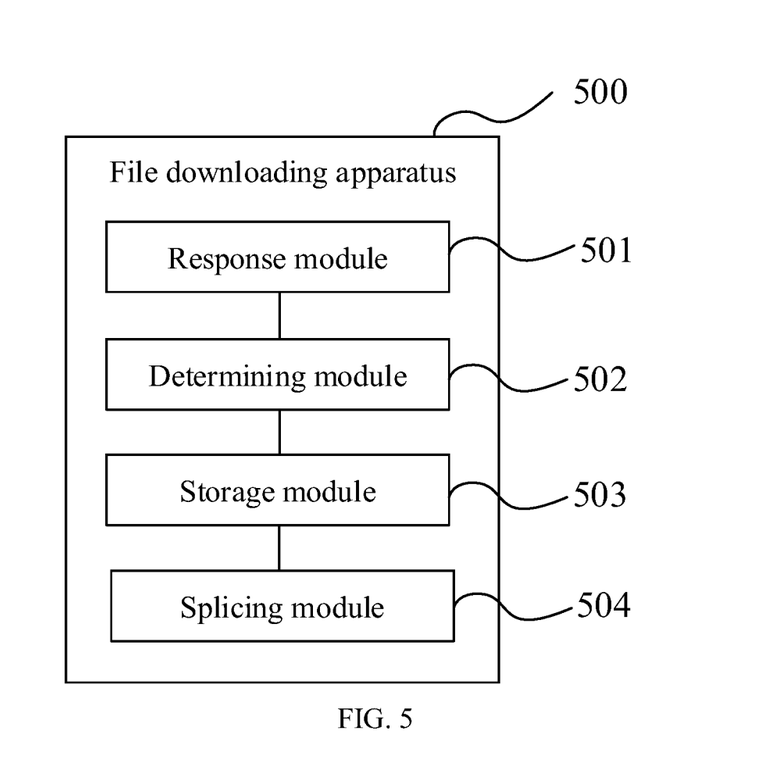
FIG. 5 is a block diagram of a file downloading apparatus according to an exemplary embodiment of the present disclosure.

Based on the same design, an embodiment of the present disclosure further provides a file downloading apparatus. The apparatus may be part or all of an electronic device by software, hardware, or a combination of both. Referring to FIG. 5, the file downloading apparatus 500 may include:

a response module 501 configured to switch, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface;

a determining module 502 configured to take file data downloaded by the first downloading interface this time as a file fragment, and determine index information of the file fragment;

a storage module 503 configured to store the index information in a database; and a splicing module 504 configured to sequentially read, based on a storage sequence of index information in the database subsequent to completing a task of downloading the target file, file fragments corresponding to the index information and splicing the file fragments to obtain the target file.

Optionally, file data downloaded by the foreground downloading interface is stored in a disk, and file data downloaded by the background downloading interface is stored in a temporary storage location. The apparatus 500 further includes a transferring apparatus configured to transfer the file data downloaded by the background downloading interface from the temporary storage location into the disk in real time.

Optionally, the response module 501 includes:
a breakpoint location determining sub-module configured to take a location, in the target file, of file data in the file fragment that has been written and stored to the disk as a breakpoint location; and
a downloading sub-module configured to continue to download the target file from the breakpoint location by the second downloading interface.

The determining module 502 includes:
an index information determining sub-module configured to determine the index information based on a start offset address and a disk termination offset address, in the disk, of the file data in the file fragment that has been stored to the disk.

Optionally, the splicing module 504 includes:
a reading sub-module configured to determine, for each piece of the index information, a target file fragment corresponding to the piece of the index information, and read, from the target file fragment, file data between the disk start offset address and the disk termination offset address in the index information; and
a splicing sub-module configured to sequentially splice the read file data to obtain the target file.

Optionally, the index information of each of the file fragments further includes a fragment index identifier. The determining module 502 includes:
a file fragment determining sub-module configured to take the file data downloaded by the first downloading interface this time as a file fragment, and set a file fragment identifier of the file fragment.

The reading sub-module is specifically configured to determine, for each piece of the index information, the target file fragment corresponding to the piece of the index information based on the fragment index identifier of the index information and the file fragment identifier; and read, from the target file fragment, the file data between the disk start offset address and the disk termination offset address in the index information.

Optionally, the foreground downloading interface includes a downloading interface provided by a private network library of a third party, and the background downloading interface includes a downloading interface provided by an IOS.

Optionally, the database is a key-value database, keys in key-value pairs in the key-value database correspond to disk names of disks, and values in the key-value pairs in the key-value database correspond to index information of file fragments under the disks corresponding to the disk names.

As for the apparatus in the above embodiment, the specific manner in which each module performs operations has been described in detail in the method embodiment, which is thus not described in detail here.

Based on the same design, an embodiment of the present disclosure further provides a computer-readable medium having a computer program stored thereon. The program, when executed by a processing apparatus, implements steps of any one of the file downloading methods described above.

Based on the same design, an embodiment of the present disclosure further provides an electronic device. The electronic device includes:
a storage apparatus having one or more computer programs stored thereon; and
one or more processing apparatuses configured to execute the one or more computer programs in the storage apparatus, to implement steps of any one of the file downloading methods described above.

Figure 6:
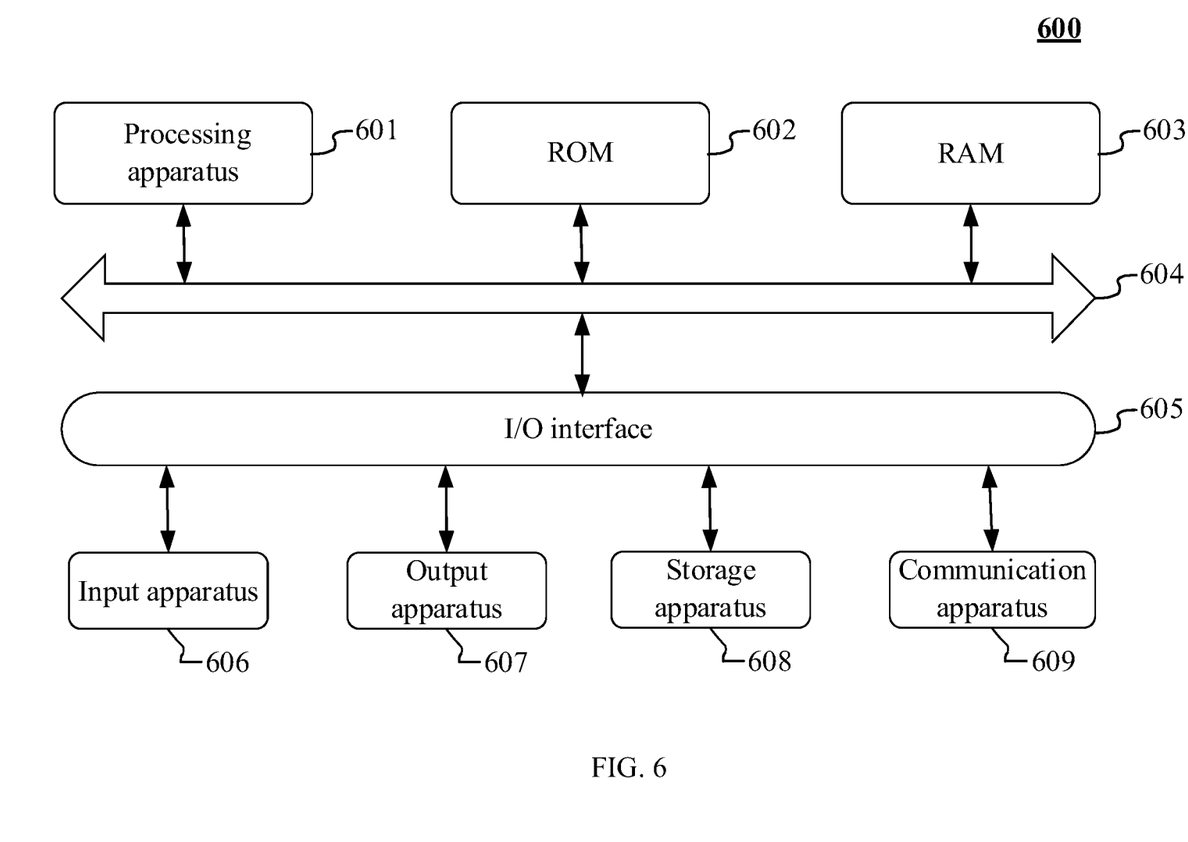
FIG. 6 is a schematic structural diagram of an electronic device according to an exemplary embodiment of the present disclosure.

Referring to FIG. 6 below, a schematic structural diagram of an electronic device 600 suitable for implementing the embodiments of the present disclosure is illustrated. The terminal device in the embodiment of the present disclosure may include but is not limited to mobile terminals such as a mobile phone, a laptop, a digit broadcasting receiver, a personal digital assistant (PDA), a tablet computer (PAD), a portable media player (PMP) and a vehicle-mounted terminal (for example, a vehicle-mounted guidance terminal), as well as fixed terminals such as a digital TV and a desktop computer. The electronic device shown in FIG. 6 is merely an example and should not impose any limitation on the function and scope of usage of the embodiments of the present disclosure.

As shown in FIG. 6, the electronic device 600 may include a processing apparatus (for example, a central processing unit and a graphics processing unit) 601 that may perform various appropriate actions and processing based on programs stored in a read-only memory (ROM) 602 or programs loaded from a storage apparatus 608 into a random access memory (RAM) 603. Various programs and data required for operations of the electronic device 600 are also stored in the RAM 603. The processing apparatus 601, the ROM 602, and the RAM 603 are connected to each other through a bus 604. An input/output (I/O) interface 605 is also connected to the bus 604.

Typically, the following apparatuses may be connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display (LCD), a speaker and a vibrator; the storage apparatus 608 including, for example, a magnetic tape and a hard disk; and a communication apparatus 609. The communication device 609 may allow the electronic device 600 to communicate with other devices in a wireless or wired manner to exchange data. Although FIG. 6 illustrates the electronic device 600 with various apparatuses, it is to be understood that it is not required to implement or have all of the apparatuses illustrated. More or fewer apparatuses may alternatively be implemented or available.

In particular, according to the embodiment of the present disclosure, the process described above with reference to the flowchart may be implemented as a computer software program. For example, the embodiment of the present disclosure includes a computer program product. The computer program product includes a computer program carried on a non-transitory computer-readable medium. The computer program includes a program code for performing the method shown in the flowchart. In this embodiment, the computer program may be downloaded and installed from a network via the communication apparatus 609, or installed from the storage apparatus 608, or installed from the ROM 602. When the computer program is executed by the processing apparatus 601, the above-mentioned functions as defined in the method according to the embodiment of the present disclosure are performed.

It is to be noted that the computer-readable medium described above in the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination of the above. More specific examples of the computer-readable storage medium may include, but are not limited to: electrical connection via one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination of the above. According to the present disclosure, the computer-readable storage medium may be any tangible medium that includes or stores a program, and the program may be used by or in combination with an instruction execution system, apparatus, or device. According to the present disclosure, the computer-readable signal medium may include data signals propagated in a baseband or as part of a carrier wave, in which a computer-readable program code is carried. The propagated data signals may be in a variety of forms, including but not limited to electromagnetic signals, optical signals, or any suitable combination of the above. The computer-readable signal medium may also be any computer-readable medium other than the computer-readable storage medium, and the computer-readable signal medium may send, propagate, or transmit a program for use by or in conjunction with the instruction execution system, apparatus, or device. The program codes included by the computer-readable medium may be transmitted via any suitable medium, including but not limited to: wired, fiber optic cables, radio frequency (RF), etc., or any suitable combination of the above.

In some implementations, the electronic device may implement communication via any currently known or future developed network protocol such as a hypertext transfer protocol (HTTP), and may interconnect with digital data communication (for example, communication networks) of any form or medium. Examples of the communication networks include a local area network ("LAN"), a wide area networks ("WAN"), Internet work (for example, the Internet), and an end-to-end network (for example, an ad hoc end-to-end network), as well as any currently known or future developed network.

The above-mentioned computer-readable medium may be included in the above-mentioned electronic device, or be present separately and not fitted into the electronic device.

The computer-readable medium carries one or more programs which, when executed by the electronic device, cause the electronic device to: switch, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface; take file data downloaded by the first downloading interface this time as a file fragment, and determine index information of the file fragment; store the index information into a database; and sequentially read, based on a storage sequence of index information in the database subsequent to completing a task of downloading the target file, file fragments corresponding to the index information and splice the file fragments to obtain the target file.

The computer program code for performing the operations of the present disclosure may be written in one or more programming languages or combinations thereof, including, but not limited to, object-oriented programming languages, for example, Java, Smalltalk and C++, and conventional procedural programming languages, for example, "C" language. The program code may be executed entirely on a user computer, partly on a user computer, as a stand-alone software package, partly on a user computer and partly on a remote computer, or entirely on a remote computer or a server. In a case where a remote computer is involved, the remote computer may be connected to a user computer via any kind of networks, including a local area network (LAN) or a wide area network (WAN), or may be connected to an external computer (for example, via the Internet using an Internet service provider).

The flowcharts and the block diagrams in the accompanying drawings illustrate possible implementations of the architecture, functionality, and operation of the system, the method, and the computer program product according to the embodiments of the present disclosure. In this regard, each block in the flowchart or block diagram may represent a module, a program segment, or part of a code, the module, the program segment, or part of the code including one or more executable instructions for implementing specified logical functions. It is also to be noted that in some alternative implementations, the functions noted in the blocks may also occur out of the order noted in the accompanying drawings. For example, two blocks shown in succession may actually be executed in parallel substantially, and sometimes they may also be executed in an inverse order, which depends upon the functionality involved. It is also to be noted that each block in the block diagram and/or flowchart, and the combination of blocks in the block diagram and/or flowchart, may be implemented with a dedicated hardware-based system that performs the specified function or operation, or may be implemented with a combination of dedicated hardware and computer instructions.

The modules described in the embodiments of the present disclosure may be implemented in a software-based manner or may be implemented in a hardware-based manner. The name of a module in some cases does not constitute the restriction to the module itself, for example, a storage module may also be described as "a module that stores index information into a database."

The functions described above herein may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in connection with the instruction execution system, apparatus or device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any suitable combination of the above contents.

More specific examples of the machine-readable storage medium may include electrical connections based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

According to one or more embodiments of the present disclosure, Example 1 provides a file downloading method. The method includes:

switching, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface;

taking file data downloaded by the first downloading interface this time as a file fragment, and determining index information of the file fragment;

storing the index information in a database; and sequentially reading, based on a storage sequence of index information in the database subsequent to completing a task of downloading the target file, file fragments corresponding to the index information and splicing the file fragments to obtain the target file.

According to one or more embodiments of the present disclosure, Example 2 provides the method in Example 1, file data downloaded by the foreground downloading interface is stored in a disk, and file data downloaded by the background downloading interface is stored in a temporary storage location. The method further includes:

transferring the file data downloaded by the background downloading interface from the temporary storage location into the disk in real time.

According to one or more embodiments of the present disclosure, Example 3 provides the method in Example 2, and said switching a first downloading interface for currently downloading the target file to a second downloading interface includes: taking a location, in the target file, of file data in the file fragment that has been written and stored to the disk as a breakpoint location; and continuing to download the target file from the breakpoint location by the second downloading interface.

Said determining index information of the file fragment includes: determining the index information based on a start offset address and a disk termination offset address, in the disk, of the file data in the file fragment that has been written and stored to the disk.

According to one or more embodiments of the present disclosure, Example 4 provides the method in Example 3, and said sequentially reading, based on a storage sequence of the index information in the database, file fragments corresponding to the index information and splicing the file fragments to obtain the target file includes: determining, for each piece of the index information, a target file fragment corresponding to the piece of the index information, and reading, from the target file fragment, file data between the disk start offset address and the disk termination offset address in the index information; and sequentially splicing the read file data to obtain the target file.

According to one or more embodiments of the present disclosure, Example 5 provides the method in Example 4, and the index information of each of the file fragments further includes a fragment index identifier. Said taking file data downloaded by the first downloading interface this time as a file fragment includes: taking the file data downloaded by the first downloading interface this time as a file fragment, and setting a file fragment identifier of the file fragment.

Said determining, for each piece of the index information, a target file fragment corresponding to the piece of the index information, and reading, from the target file fragment, file data between the disk start offset address and the disk termination offset address in the index information includes: determining, for each piece of the index information, the target file fragment corresponding to the piece of the index information based on the fragment index identifier of the index information and the file fragment identifier; and reading, from the target file fragment, the file data between the disk start offset address and the disk termination offset address in the index information.

According to one or more embodiments of the present disclosure, Example 6 provides the method in any one of Examples 1 to 5, the foreground downloading interface includes a downloading interface provided by a private network library of a third party, and the background downloading interface includes a downloading interface provided by an IOS.

According to one or more embodiments of the present disclosure, Example 7 provides the method in Example 2, keys in key-value pairs in the key-value database correspond to disk names of disks, and values in the key-value pairs in the key-value database correspond to index information of file fragments under the disks corresponding to the disk names.

According to one or more embodiments of the present disclosure, Example 8 provides a file downloading apparatus. The apparatus includes: a response module configured to switch, in response to an obtained downloading interface switching request in a downloading process of a target file, a first downloading interface for currently downloading the target file to a second downloading interface for continuously downloading the target file, the first downloading interface being one of a foreground downloading interface and a background downloading interface, the second downloading interface being the other one of the foreground downloading interface and the background downloading interface; a determining module configured to take file data downloaded by the first downloading interface this time as a file fragment, and determine index information of the file fragment; a storage module configured to store the index information in a database; and a splicing module configured to sequentially read, based on a storage sequence of index information in the database subsequent to completing a task of downloading the target file, file fragments corresponding to the index information and splice the file fragments to obtain the target file.

According to one or more embodiments of the present disclosure, Example 9 provides the apparatus in Example 8, file data downloaded by the foreground downloading interface is stored in a disk, and file data downloaded by the background downloading interface is stored in a temporary storage location. The apparatus further includes a transferring apparatus configured to transfer the file data downloaded by the background downloading interface from the temporary storage location into the disk in real time.

According to one or more embodiments of the present disclosure, Example 10 provides the apparatus in Example 9, and the response module includes:

a breakpoint location determining sub-module configured to take a location, in the target file, of file data in the file fragment that has been written and stored to the disk as a breakpoint location; and a downloading sub-module configured to continue to download the target file from the breakpoint location by the second downloading interface.

The determining module includes: an index information determining sub-module configured to determine the index information based on a start offset address and a disk termination offset address, in the disk, of the file data in the file fragment that has been stored to the disk.

According to one or more embodiments of the present disclosure, Example 11 provides the apparatus in Example 10, and the splicing module includes: a reading sub-module configured to determine, for each piece of the index information, a target file fragment corresponding to the piece of the index information, and read, from the target file fragment, file data between the disk start offset address and the disk termination offset address in the index information; and a splicing sub-module configured to splice the read file data sequentially to obtain the target file.

According to one or more embodiments of the present disclosure, Example 12 provides the apparatus in Example 11, and the index information of each of the file fragments further includes a fragment index identifier. The determining module includes: a file fragment determining sub-module configured to take the file data downloaded by the first downloading interface this time as a file fragment, and set a file fragment identifier of the file fragment.

The reading sub-module is specifically configured to determine, for each piece of the index information, the target file fragment corresponding to the piece of the index information based on the fragment index identifier of the index information and the file fragment identifier; and read, from the target file fragment, the file data between the disk start offset address and the disk termination offset address in the index information.

According to one or more embodiments of the present disclosure, Example 13 provides the apparatus in any one of Examples 8 to 12, the foreground downloading interface includes a downloading interface provided by a private network library of a third party, and the background downloading interface includes a downloading interface provided by an IOS.

According to one or more embodiments of the present disclosure, Example 14 provides the apparatus in Example 9, keys in key-value pairs in the key-value database correspond to disk names of disks, and values in the key-value pairs in the key-value database correspond to index information of file fragments under the disks corresponding to the disk names.

The above description is merely a preferred embodiment of the present disclosure and a description of the technical principles applied. It is to be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea, for example, technical solutions formed by substituting the above features with technical features having similar functions disclosed (but not limited to) in the present disclosure.

In addition, while the operations are depicted in a particular order, it is not to be construed as requiring that the operations be performed in the particular order indicated or in a sequential order. Multitasking and parallel processing may be advantageous in certain environments. Similarly, while a plurality of specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in a plurality of embodiments individually or in any suitable sub-combination.

Although the present subject matter has been described using language specific to structural features and/or methodlogical actions, it is to be understood that the subject matter as defined in the appended claims is not necessarily limited to the particular features or actions described above. Rather, the particular features and actions described above are merely exemplary forms to implement the claims. As for the apparatus in the above embodiment, the specific manner in which each module performs operations has been described in detail in the method embodiment, which is thus not described in detail here.

What is claimed is:

1. A file downloading method, comprising:
   switching, in response to an obtained downloading interface switching request in a downloading process of a target file, a first downloading interface for currently downloading the target file to a second downloading interface for continuously downloading the target file, the first downloading interface being a first one of a foreground downloading interface and a background downloading interface, the second downloading interface being a second one of the foreground downloading interface and the background downloading interface;
   taking file data downloaded by the first downloading interface this time as a file fragment, and determining index information of the file fragment;
   storing the index information in a database;
   sequentially reading, based on a storage sequence of index information in the database subsequent to completing a task of downloading the target file, file fragments corresponding to the index information and splicing the file fragments to obtain the target file;
   wherein the file data downloaded by the foreground downloading interface is stored in a disk, and the file data downloaded by the background downloading interface is stored in a temporary storage location;
   transferring the file data downloaded by the background downloading interface from the temporary storage location into the disk in real time;
   wherein switching the first downloading interface for currently downloading the target file to the second downloading interface comprises:
   taking a location, in the target file, of file data in the file fragment that has been written and stored to the disk as a breakpoint location; and
   continuing to download the target file from the breakpoint location by the second downloading interface; and
   wherein determining the index information of the file fragment comprises:
   determining the index information based on a disk start offset address and a disk termination offset address, in the disk, of the file data in the file fragment that has been written and stored to the disk.

2. The method according to claim 1, wherein said sequentially reading, based on the storage sequence of the index information in the database, the file fragments corresponding to the index information and splicing the file fragments to obtain the target file comprises:
   determining, for each piece of the index information, a target file fragment corresponding to the piece of the index information, and reading, from the target file fragment, the file data between the disk start offset address and the disk termination offset address in the index information; and sequentially splicing the read file data to obtain the target file.

3. The method according to claim 2, wherein the index information of each of the file fragments further comprises a fragment index identifier;

wherein taking file data downloaded by the first downloading interface this time as the file fragment comprises:

setting a file fragment identifier of the file fragment; and wherein determining, for each piece of the index information, the target file fragment corresponding to the piece of the index information, and reading, from the target file fragment, file data between the disk start offset address and the disk termination offset address in the index information comprises:

determining, for each piece of the index information, the target file fragment corresponding to the piece of the index information, based on the fragment index identifier of the index information and the file fragment identifier.

4. The method according to claim 1, wherein:

the foreground downloading interface comprises a downloading interface provided by a private network library of a third party, and the background downloading interface comprises a downloading interface provided by iPhone Operation System (IOS).

5. The method according to claim 1, wherein:

the database is a key-value database;

keys in key-value pairs in the key-value database correspond to disk names of disks; and values in the key-value pairs in the key-value database correspond to the index information of the file fragments under the disks corresponding to the disk names.

6. A non-transitory computer-readable medium having a computer program stored thereon, wherein the program, when executed by a processing apparatus, implements a file downloading method, the method comprising:

switching, in response to an obtained downloading interface switching request in a downloading process of a target file, a first downloading interface for currently downloading the target file to a second downloading interface for continuously downloading the target file, the first downloading interface being a first one of a foreground downloading interface and a background downloading interface, the second downloading interface being a second one of the foreground downloading interface and the background downloading interface;

taking file data downloaded by the first downloading interface this time as a file fragment, and determining index information of the file fragment;

storing the index information in a database;

sequentially reading, based on a storage sequence of index information in the database subsequent to completing a task of downloading the target file, file fragments corresponding to the index information and splicing the file fragments to obtain the target file;

wherein the file data downloaded by the foreground downloading interface is stored in a disk, and the file data downloaded by the background downloading interface is stored in a temporary storage location;

transferring the file data downloaded by the background downloading interface from the temporary storage location into the disk in real time;

wherein switching the first downloading interface for currently downloading the target file to the second downloading interface comprises:

taking a location, in the target file, of file data in the file fragment that has been written and stored to the disk as a breakpoint location; and continuing to download the target file from the breakpoint location by the second downloading interface; and wherein determining the index information of the file fragment comprises:

determining the index information based on a disk start offset address and a disk termination offset address, in the disk, of the file data in the file fragment that has been written and stored to the disk.

7. The non-transitory computer-readable medium according to claim 6, wherein sequentially reading, based on the storage sequence of index information in the database, the file fragments corresponding to the index information and splicing the file fragments to obtain the target file comprises:

determining, for each piece of the index information, a target file fragment corresponding to the piece of the index information, and reading, from the target file fragment, the file data between the disk start offset address and the disk termination offset address in the index information; and sequentially splicing the read file data to obtain the target file.

8. The non-transitory computer-readable medium according to claim 7, wherein the index information of each of the file fragments further comprises a fragment index identifier;

wherein taking file data downloaded by the first downloading interface this time as the file fragment comprises:

setting a file fragment identifier of the file fragment; and wherein determining, for each piece of the index information, the target file fragment corresponding to the piece of the index information, and reading, from the target file fragment, file data between the disk start offset address and the disk termination offset address in the index information comprises:

determining, for each piece of the index information, the target file fragment corresponding to the piece of the index information, based on the fragment index identifier of the index information and the file fragment identifier.

9. An electronic device, comprising:

a storage apparatus having one or more computer programs stored thereon; and one or more processing apparatuses configured to execute the one or more computer programs in the storage apparatus, to implement a file downloading method, the method comprising:

switching, in response to an obtained downloading interface switching request in a downloading process of a target file, a first downloading interface for currently downloading the target file to a second downloading interface for continuously downloading the target file, the first downloading interface being a first one of a foreground downloading interface and a background downloading interface, the second downloading interface being a second one of the foreground downloading interface and the background downloading interface;

taking file data downloaded by the first downloading interface this time as a file fragment, and determining index information of the file fragment;

storing the index information in a database;

sequentially reading, based on a storage sequence of index information in the database subsequent to completing a task of downloading the target file, file fragments corresponding to the index information and splicing the file fragments to obtain the target file;

wherein the file data downloaded by the foreground downloading interface is stored in a disk, and the file data downloaded by the background downloading interface is stored in a temporary storage location;

transferring the file data downloaded by the background downloading interface from the temporary storage location into the disk in real time;

wherein switching the first downloading interface for currently downloading the target file to the second downloading interface comprises:

taking a location, in the target file, of file data in the file fragment that has been written and stored to the disk as a breakpoint location; and continuing to download the target file from the breakpoint location by the second downloading interface; and wherein determining the index information of the file fragment comprises:

determining the index information based on a disk start offset address and a disk termination offset address, in the disk, of the file data in the file fragment that has been written and stored to the disk.

10. The electronic device according to claim 9, wherein sequentially reading, based on the storage sequence of the index information in the database, file fragments corresponding to the index information and splicing the file fragments to obtain the target file comprises:

determining, for each piece of the index information, a target file fragment corresponding to the piece of the index information, and reading, from the target file fragment, the file data between the disk start offset address and the disk termination offset address in the index information; and sequentially splicing the read file data to obtain the target file.

11. The electronic device according to claim 10, wherein the index information of each of the file fragments further comprises a fragment index identifier;

wherein taking the file data downloaded by the first downloading interface this time as the file fragment comprises:

setting a file fragment identifier of the file fragment; and wherein determining, for each piece of the index information, the target file fragment corresponding to the piece of the index information, and reading, from the target file fragment, file data between the disk start offset address and the disk termination offset address in the index information comprises:

determining, for each piece of the index information, the target file fragment corresponding to the piece of the index information, based on the fragment index identifier of the index information and the file fragment identifier.

12. The electronic device according to claim 9, wherein:

the foreground downloading interface comprises a downloading interface provided by a private network library of a third party, and the background downloading interface comprises a downloading interface provided by an IOS.

13. The electronic device according to claim 9, wherein:

the database is a key-value database;

keys in key-value pairs in the key-value database correspond to disk names of disks; and values in the key-value pairs in the key-value database correspond to the index information of the file fragments under the disks corresponding to the disk names.

* * * * *